Oct. 4, 1960 N. CAPELLARO 2,954,921

REGISTER REVERSING AND ENGAGING MECHANISM

Filed Nov. 17, 1953 4 Sheets-Sheet 1

Oct. 4, 1960 N. CAPELLARO 2,954,921

REGISTER REVERSING AND ENGAGING MECHANISM

Filed Nov. 17, 1953 4 Sheets-Sheet 2

Oct. 4, 1960 N. CAPELLARO 2,954,921

REGISTER REVERSING AND ENGAGING MECHANISM

Filed Nov. 17, 1953 4 Sheets-Sheet 3

1

2,954,921

REGISTER REVERSING AND ENGAGING MECHANISM

Natale Capellaro, Ivrea, Italy, assignor to Ing. C. Olivetti & C. S.p.A., Ivrea, Italy Filed Nov. 17, 1953, Ser. No. 392,660

Claims priority, application Italy Nov. 22, 1952

14 Claims. (Cl. 235—60.2)

The present invention relates to computing machines and is concerned with the general organization and structure of the register and of the mechanisms associated therewith.

In an adding and subtracting machine of a known type, wherein the register comprises a cradle frame supporting two sets of intermeshed register wheels, and wherein a reversing mechanism is provided for reversing said cradle frame through 180° for addition and subtraction, said reversing mechanism includes a pair of actuating elements and a slide selectively operable by either of said actuating elements, said slide acting upon said cradle frame through a gearing enabling the cradle frame to be reversed through 180°.

It is an object of the invention to provide an improved reversing mechanism for a register of the type described.

Another object of the invention is to provide an improved mechanism for shifting the register toward and from the actuators thereof to engage and disengage the register wheels and said actuators.

Further objects and details of the invention will be apparent from the following description when read in connection with the accompanying drawings, wherein.

*General description*

Figure 1:
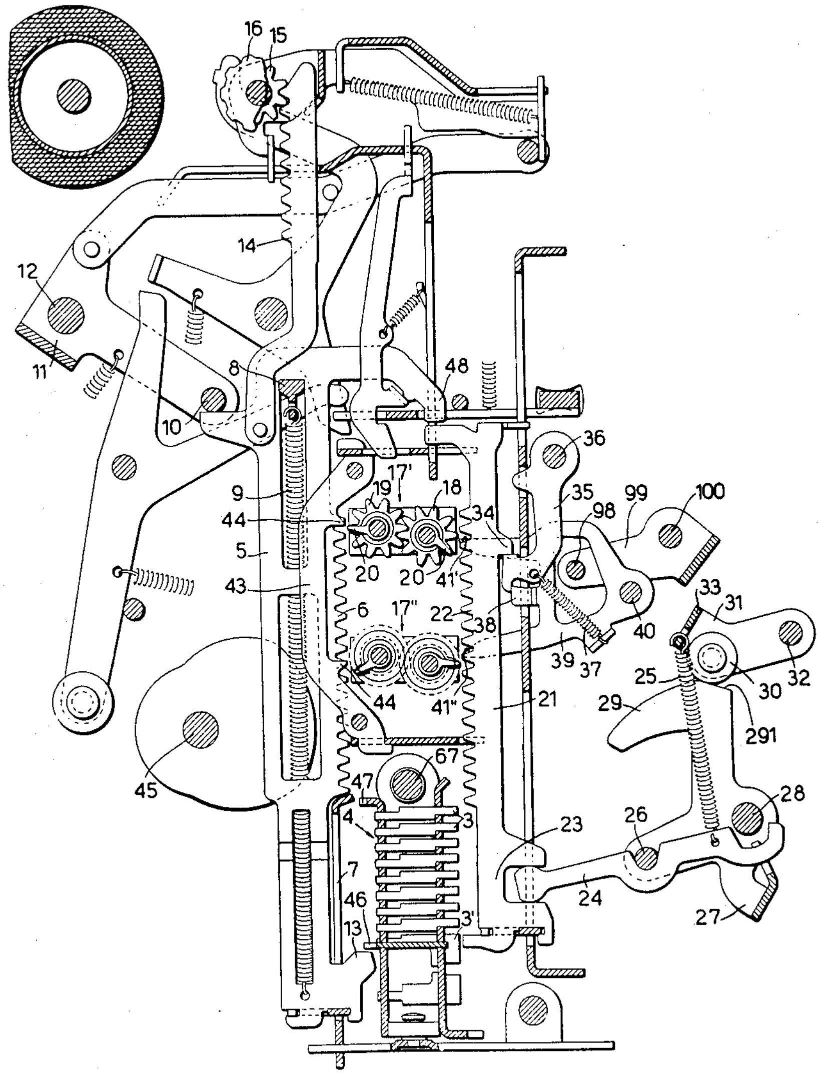
Fig. 1 is a longitudinal sectional view through a machine embodying the invention.

The particular machine shown in the drawings is identical in its general organization and principle with that illustrated in my copending application Serial Number 369,059, filed July 20, 1953, of which a brief description will now be given. To facilitate the comprehension thereof, like reference characters represent corresponding parts in the drawings of the present application and of said copending application.

As shown in Fig. 1, the machine comprises the usual pin carriage 4, movable transversely on fixed shafts, as the shaft 67, and carrying rows of pins 3 and 3' adapted to be shifted to the left of Fig. 1 by a value indexing mechanism, not disclosed.

A set of actuators 5 is arranged at the left hand side of the pin carriage 4, each actuator being provided with rack teeth 6 for engaging a corresponding pinion of a register 17'. The latter is of the well known type comprising two sets of pinions, designated as 18 and 19, which are in constant mesh with each other and which are supported by a suitable cradle.

Each actuator 5 is provided with a projection 13 upon which the pins of the pin carriage 4 may act as stops. Furthermore, each actuator 5 is associated, through a rack 14 and a pinion 15, with a type carrier 16.

A second set of actuators 21 is arranged on the right hand side of the pin carriage 4, each actuator being provided with rack teeth 22 for engaging a corresponding pinion of the register 17'.

As fully described in said copending application, the register 17' is shiftable to the right of Fig. 1 to engage with the actuators 21 in amount entering operations such as addition and subtraction, the upward movement of the actuators 21 being differentially limited by arms 48 projecting from the actuators 5.

45 designates the main operating shaft of the machine. As is well known in the art, this shaft makes a full rotation at each machine cycle and by known means, not to be described, it imparts a forward and then a return stroke to one or more shafts, as the shafts 12, 28 and 100, at each machine cycle. More particularly, shaft 12 rocks first counterclockwise and then clockwise, and the shafts 28 and 100 rock first clockwise and then counterclockwise.

In the position shown in Fig. 1 each actuator 21 is arrested, in a manner well known per se, by a transfer trip lever 35 cooperating with an abutment 34 of the actuator. Each transfer trip lever is loosely mounted upon a shaft 36 and is urged to rotate counterclockwise by a spring 37. In the position of Fig. 1 the transfer trip lever 35 is arrested by a bent-over lug 38 of a lever 39 pivoted at 40 and urged clockwise by the spring 37 attached thereto. Each lever 39 is provided with a pawl 41' which is engageable, in a manner known per se, by a transfer tooth 20 of the register pinion of the next lower order.

If the transfer tooth 20 strikes the corresponding pawl 41', the lever 39 is rocked counterclockwise, whereby its bent-over lug 38 disengages the transfer trip lever 35 which normally arrests the actuator 21 of the next higher order. The transfer trip lever 35 is thereupon arrested by a restoring bar 98, supported by arms 99 secured to a shaft 100, and it locks the lever 39 in its rocked position, Fig. 3.

At the beginning of the next following cycle the restoring bar 98 rocks clockwise and restores the transfer trip levers 35 found out of their normal position of Fig. 1. At the same time, the corresponding levers 39 are restored by their respective springs 37. If a spring 37 is accidentally unable to lift the corresponding lever 39, the latter is rocked by the restoring bar 98 itself.

To enable the transfer trip levers 35 to be restored without interference by the abutment 34 of the actuators 21, during restoration of the transfer trip levers 35 the actuators 21 are held arrested against the arms 48, in such a position to leave a sufficient clearance between the transfer trip levers and the abutments 34. At the end of the machine cycle, when the actuators 21 are arrested by the transfer trip levers 35, a like clearance is left between the upper end of each actuator 21 and the corresponding arm 48, as shown in Fig. 1.

As described in said copending application, the actuators 21 are reciprocated by means of arms 24 engaging a fork 23 with which each actuator 21 is formed. Each arm 24 is urged by a spring 25 and the set of arms is held in the position of Fig. 1 by a restoring bar 26 carried by a bail 27 secured to a shaft 28.

The bail 27 is formed with a cam shaped arm 29, on which rests a roller 30 pivoted on a bail 31. The bail 31 is loosely mounted upon a shaft 32 and is urged counterclockwise by the springs 25 secured to its transverse bar 33. Normally, the springs 25 urge the arms 24 to rotate counterclockwise whereby the actuators 21 are urged downwards.

Figures 2, 3, 5, 11:
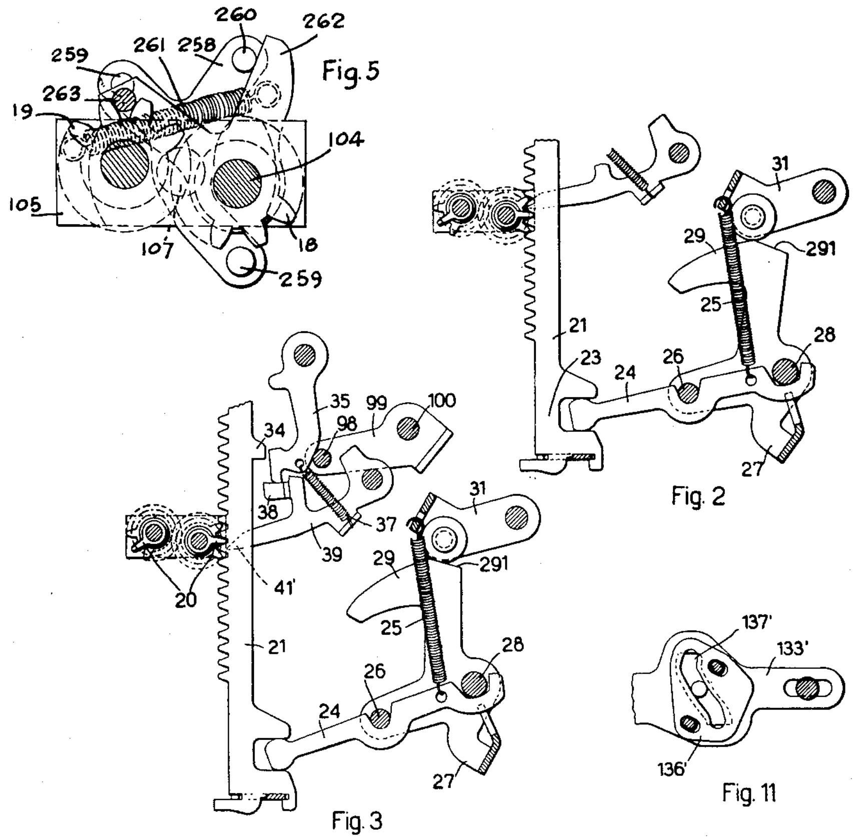
Fig. 2 shows an actuator thereof in the position "zero"
Fig. 3 shows said actuator after release from its transfer trip member for transferring one unit to the corresponding register wheel.
Fig. 5 is an enlarged view of a modified form of a detail of the register shown in Fig. 4.
Fig. 11 shows a modified form of a detail of the mechanism shown in Fig. 9.

When the bail 27 is rocked clockwise the cam 29 rocks the bail 31 clockwise, Fig. 2. Thus either the tension of the springs 25 is increased or, if the actuators 21 have been moved downward, as in Fig. 3, the springs 25 are retensioned.

The cam 29 is shaped with a first abrupt straight edge 291 and then with a gradually sloping edge. When the bail 27 is rocked counterclockwise for restoring the actuators 21, as described in said application, it is assisted by the energy stored in the springs 25. This is effected at a controlled rate which is of particular importance during the last degrees of the machine cycle, when the restoring bar 26 has to rock all the arms 24 about their pivot point in the forks 23. To this end the abrupt straight edge of the cam 29 has been provided.

In total taking the register 17′ is shiftable to the left of Fig. 1 to engage with the actuators 5, stop lugs 44 being provided on fixed stop plates 43 to act as zero stops during the upward movement of the actuators 5.

Moreover, to reverse the register from addition to subtraction and for enabling positive totals as well as negative totals to be taken therefrom, the register cradle frame is rotatable through 180° about an axis located intermediate between the axes of the two sets of register pinions 18 and 19.

Optionally, a second register 17″ may be provided and the following description is drawn to a double register computing machine.

*Register structure*

Figures 4, 7, 8, 12:
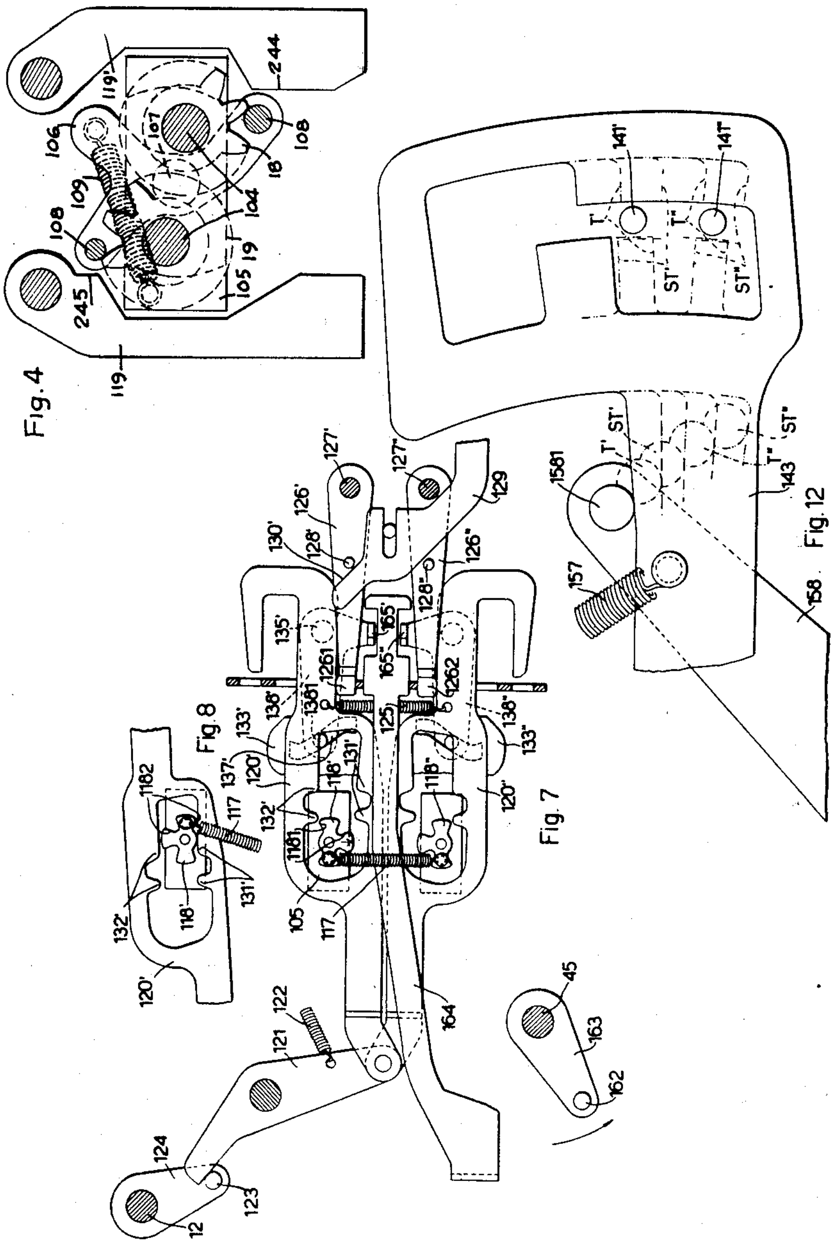
Fig. 4 is an enlarged detail view of a register of the machine.
Fig. 7 is a longitudinal sectional view of the register reversing mechanism.
Fig. 8 is a detail view of the reversing mechanism.
Fig. 12 is an enlarged view of a detail of the mechanism shown in Fig. 10.

As shown in Fig. 4, each set of register pinions is loosely mounted upon a shaft 104. The two shafts 104 are rigidly supported at each of their ends by a frame piece 105, Figs. 6 and 13, thereby forming a cradle frame, which pivots about an intermediate stud 107 projecting from both sides of each frame piece 105, and journalled as will be described later.

Figures 6, 10, 13:
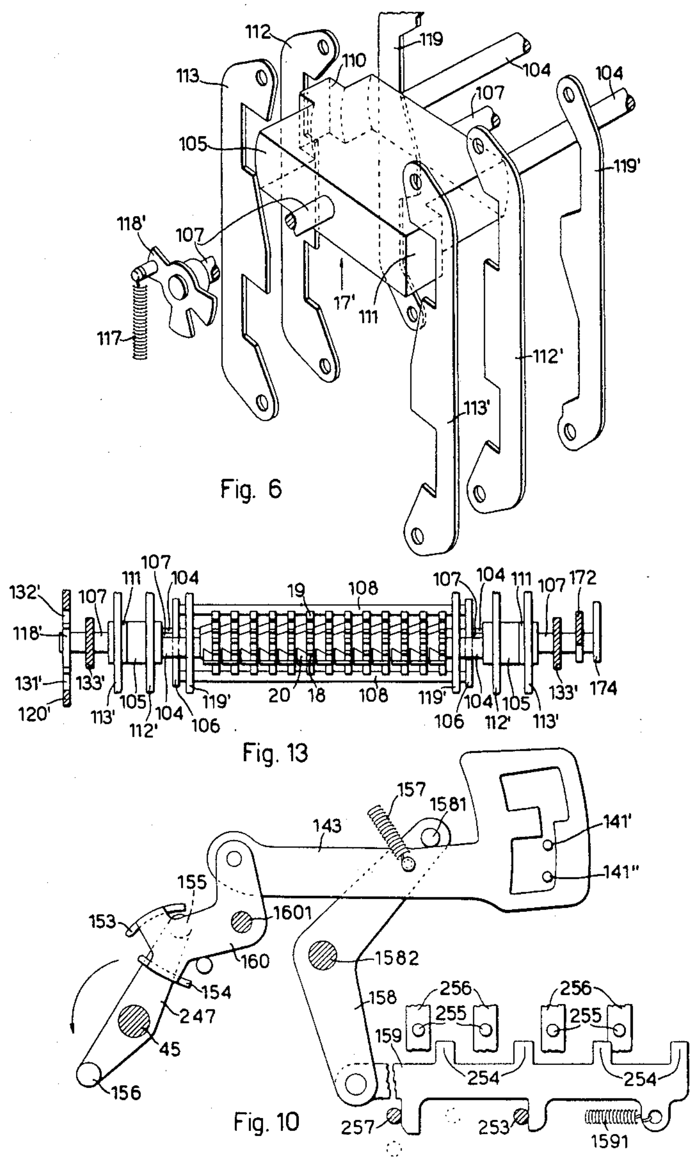
Fig. 6 is an enlarged view of the means guiding said register.
Fig. 10 is a fragmentary sectional view of the register engaging and disengaging mechanism.
Fig. 13 is a frontal sectional view of a register.

A lever 106, Figs. 4 and 13, is pivoted on each stud 107 at the inner side of each frame piece 105. The two levers 106 are connected together by means of two detent bars 108, each bar 108 being in cooperative relation with one set of register pinions. A spring 109, Fig. 4, tensioned between an arm formed integral with each lever 106 and the corresponding frame piece 105, urges the lever 106 counterclockwise, thereby urging each detent bar 108 into engagement with one side of each pinion of the corresponding set of register pinions. As clockwise rotation of one pinion of each pair of pinions involves counterclockwise rotation of the other pinion, it will be seen that the pinions are locked against rotation in both directions.

At rest the register 17′ is in the intermediate position shown in Figs. 1 and 6. For the purpose of being exactly guided when shifted either rightwards or leftwards, each frame piece 105 of the register cradle is formed with two projections 110 and 111, Fig. 6, which are located in different longitudinal planes. In the plane of each projection 110 two like fixed plates 112 and 112′ are symmetrically located. Similarly, in the plane of each projection 111 two like fixed plates 113 and 113′ are symmetrically located.

Each of said plates is formed with a cutout adapted to receive the frame piece 105. However, it is to be observed that the upper horizontal edge of the cutout of the plates 113 and 113′ is longer than the corresponding lower horizontal edge.

Since the machine may be equipped with a second register 17″, Fig. 1, the plates 112, 112′, 113 and 113′ may be formed as well at their lower ends with like cutouts adapted to receive the frame piece of the register cradle of the lower register 17″. As the latter is in all respects identical with the upper register 17′, no further description will be given.

As said hereinabove, the register 17′ is reversible through 180° about the pivot studs 107.

As shown in Figs. 6 and 13, a three-armed plate 118′ is secured to the outer end of the left hand pivot stud 107. A spring 117, Fig. 6, is tensioned between an arm of said plate 118′ and an arm of a similar three-armed plate 118″ secured to the pivot stud of the lower register 17″, Fig. 7. The cradle frame of the upper register 17′ is thereby urged counterclockwise, as seen in Fig. 6, the projection 111 of its frame piece 105 being arrested by the upper edge of the cutout of the plate 113′.

As mentioned above, for the operations of addition and subtraction the register 17′ is shifted rightwards, Figs. 1 and 6. The projection 111 is thereupon guided by both edges of the cutout of the plate 113′ after partial movement to the right.

As mentioned above, for taking a total the register 17′ is shifted leftwards. The projection 110 is thereupon guided by both edges of the cutout of the plate 112, and, moreover, the frame piece 105 itself is guided by the upper edge of the cutout of the plate 113.

It will thus be seen that the register, when shifted either rightwards or leftwards, is guided on both the upper and the lower face of each frame piece of its cradle frame, thereby affording the most exact engagement of the register pinions with the actuators concerned.

If the register 17′, when at rest as in Figs. 1 and 6, is reversed about its pivot studs 107, in the manner hereinafter described, upon a clockwise rotation of 180° the projection 111 is arrested by the upper edge of the cutout of the plate 113. If the register is thereupon shifted either rightwards or leftwards, each frame piece 105 will be guided by the plates 113, 113′ and 112′ in a manner similar to that described above.

Since the register pinions are normally locked against rotation by the detent bars 108, Fig. 4, as described above, it is necessary to unlock the same upon shifting the register into engagement with either set of actuators. To this end a further pair of plates 119, 119′, Fig. 6, is arranged at each end of the register, Fig. 13, the two plates of each pair being similarly shaped but reversely arranged, as best seen in Fig. 6.

If the register 17′ is shifted rightwards, Fig. 4, the edge 244 of each plate 119′ arrests the lower detent bar 108, swinging the levers 106 clockwise, whereby the register pinions of both sets are unlocked. Similarly, if the register 17′ is shifted leftwards, the edge 245 of each plate 119 arrests the upper detent bar 108, swinging the levers 106 clockwise, whereby the register pinions of both sets are likewise unlocked.

Upon resetting the register into its position of rest the springs 109 are enabled to urge the detent bars 108 into their effective position.

Of course, the mode of operation of the detent bars is the same when the register has been reversed through 180°.

Since the pivot studs 107 of the levers 106 are located intermediate between the two shafts 104, the detent bars 108 are enabled to contact and rotate those register pinions which may be slightly misaligned into their exact position.

This is of particular importance in view of the fact that, as described above, the actuators 21 are arrested by the detents 35 an additional amount beyond their theoretical zero position. Upon disengaging the register from the actuators 21 after an operation of addition or subtraction, the register pinions are thus restored through the corresponding angle by the detent bars 108.

*Register reversing mechanism*

The three-armed plates 118′ and 118″, Fig. 7, are located each in a cutout portion of a corresponding slide 120′ and 120″, respectively. Both slides are pivoted on a lever 121, which is urged counterclockwise by a spring 122. The lever 121 is normally arrested in the position of Fig. 7 by a pin 123 carried by an arm 124 fastened to the shaft 12. A spring 125 is tensioned between the slides 120′ and 120″, the downward movement of the upper slide 120′ being arrested by a bent-over lug 1261 of a lever 126′ pivoted at 127′, and the upward movement of the lower slide 120″ being arrested by a bent-over lug 1262 of a lever 126″ pivoted at 127″. A stud 128′ is secured to the lever 126′, a like stud 128″ is secured to the lever 126″; both studs lie in the path of a subtract slide 129.

As mentioned above, at the beginning of a machine cycle the shaft 12 rocks counterclockwise. It will thus be seen that both slides 120′ and 120″ are positively moved leftwards. As the shaft 12 rotates clockwise in the latter part of the cycle, the spring 122 causes the slides 120′ and 120″ to be moved rightwards. Both slides are thus reciprocated during each machine cycle.

If a machine cycle is neither a subtract nor a negative total taking cycle, the slides 120′ and 120″ remain, at the beginning of the cycle, in the vertical position shown in Fig. 7. Therefore, if at the time the three-armed plates 118′ and 118″ are in the position shown in Fig. 7, which is the additive position of the corresponding registers, the slides 120′ and 120″ are moved idly.

If the upper register 17′ is to be reversed to subtraction, a subtraction control mechanism known in the art and not to be described causes the subtract slide 129 to be moved rightwards. The edge 130′ of the latter elevates the stud 128′, whereby the lever 126′ is rocked clockwise and the slide 120′ is raised about its pivot point on the lever 121. Upon the ensuing leftward movement of the slide 120′, the lower driving elements, or tooth projections 131′ thereon sequentially engage the right side edges 1181 of the downwardly and rightwardly directed lobes, or teeth of the three armed plate 118′, whereby the plate 118′ and the upper register cradle frame are bodily rotated clockwise through 180° into the position of Fig. 8, wherein the projection 111, Fig. 6, is spring pressed against the upper edge of the cutout portion of the plate 113.

The slide 120′ is thereupon returned to its right hand position without further affecting the three-armed plate 118′.

As is known in the art, at the end of the machine cycle the subtraction control mechanism cited above causes the subtract slide 129 to return to its left hand end position of Fig. 7, whereupon the lever 126′ and the slide 120′ are permitted to return to their lower position of Fig. 7.

It will thus be observed that at the end of this machine cycle the upper register stays in its subtractive position.

If at the beginning of the next following cycle the subtract slide 129 is set for subtraction again, the slide 120′ is raised as before into a position of Fig. 8 wherein its reciprocation is ineffective. If, on the contrary, the subtract slide 129 has not been set for subtraction, the slide 120′ when moving leftwards is in its lower position wherein the upper driving elements, or tooth projections 132′ thereon sequentially engage the right side edges 1182 of the upwardly and rightwardly directed lobes, or teeth (Fig. 8) of plate 118′ whereby the plate 118′ and the upper register cradle frame are bodily rotated counterclockwise through 180° and restored into their additive position (Fig. 7).

In the foregoing description the reversible means 118′ has been shown and referred to as a three-armed plate. However it will be apparent that said plate may also be considered as a mutilated pinion, which in the present example is a four-teeth pinion having one tooth mutilated, said mutilation enabling either set of projections 131′ and 132′, which may be considered as a rack engageable with said pinion, to move idly when required upon reciprocation of the slide 120′.

As regards the lower register 17″, the mode of operation of the reversing mechanism therefore is identical with that described above, with the exception that the subtract slide 129 is moved leftwards instead of rightwards, thus lowering the lever 126″ and the slide 120″.

*Register engaging and disengaging mechanism*

The mechanism for shifting each register into engagement either with the actuators 21 or with the actuators 5 and for disengaging it therefrom will now be described.

Figure 9:
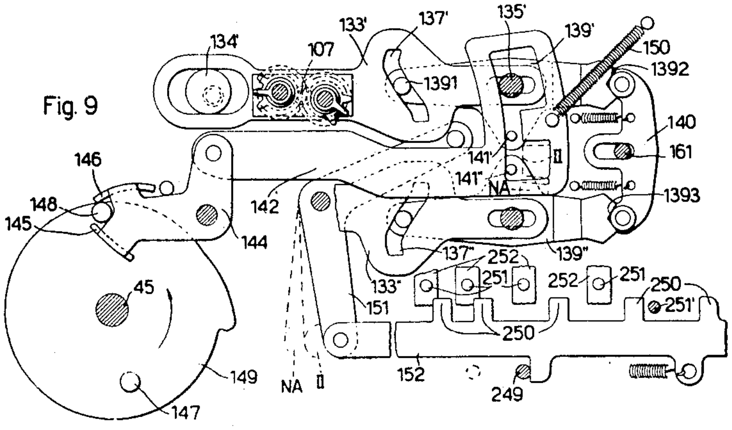
Fig. 9 is a longitudinal sectional view of the register engaging and disengaging mechanism.

The outer pivot stud 107 projecting from each register cradle frame piece 105, Figs. 6, 9 and 13, is journalled on a slide 133′, 133″, respectively, Fig. 9. The slide 133′ is guided by a fixed stud 134′ and by a shaft 135′, loosely mounted upon the machine frame. The slide 133″ is guided in a similar manner. Each slide is provided with a cam slot 137′ and 137″, respectively.

The cam slot 137′ of the left hand slide 133′, Fig. 13, is engaged by a stud 1381 of a lever 138′, Fig. 7, secured to the shaft 135′, Figs. 7 and 9. The cam slot 137′, of the right hand slide 133′, Fig. 13, is engaged by a stud 1391 of a lever 139′, Fig. 9, secured as well to the shaft 135′. Similar levers 138″, Fig. 7, and 139″, Fig. 9, are provided for the lower register 17″. The right hand end of each of the levers 139′ and 139″, Fig. 9, is formed with notches 1392 and 1393 cooperating with a detent plate 140, slidably arranged on a fixed stud 161. Each lever is moreover provided with a stud 141′ and 141″, respectively, said studs being arranged within a cutout portion of a slide 142, Fig. 9, as well as within a cutout portion of a slide 143, Fig. 10. As hereinafter described, said cutout portions are shaped to enable each slide to selectively engage the studs 141′, 141″.

The slide 142, Fig. 9, is pivoted on a lever 144 provided with bent-over lugs 145, 146 cooperating with studs 147 and 148, respectively, carried by a cam disc 149. The latter is secured to the main shaft 45. The slide 142 is urged counterclockwise about its pivotal connection with lever 144 by a spring 150 and is arrested in the position of Fig. 9 by a stud secured to a lever 151. The latter is pivotally connected to a slide 152, which is urged leftwards by a spring which prevails over the spring 150. A reciprocating bar 249 normally arrests the slide 152 in the position of Fig. 9.

The slide 152 is provided with a set of stop lugs 250 which may be selectively arrested by studs 251 secured to depressible stems 252 of a set of function control keys. Fig. 9 shows the stems 252 of four keys, which are, beginning from the left, the add key and the subtract key for the upper register 17′ and the add key and the subtract key for the lower register 17″. These keys are well known in the art and will not be described. However, it may be assumed that said keys are, in the order cited, the keys 51′, 52′, 51″ and 52″ shown in Fig. 2 of my said copending application.

At the beginning of each machine cycle the bar 249 releases the slide 152. If any of said keys has been depressed, the slide 152 moves until arrested by the stud 251 of the depressed key stem 252. If, on the contrary, no one of said keys has been depressed, the slide 152 is permitted to move leftwards until arrested by a fixed stud 251′, taking up the left hand end position shown in dotted lines and designated as NA.

The first two key stems 252 from the left are arranged in such a position that upon depression they arrest the slide 152 immediately.

The other two key stems 252 are arranged to arrest the slide 152 in the intermediate position II shown with dotted lines in Fig. 9.

The slide 143, Fig. 10, is pivoted on a lever 160 mounted on a shaft 1601 and provided with bent-over lugs 153, 154 cooperating with studs 155 and 156, respectively, carried by a lever 247. The latter is secured to the main shaft 45. The slide 143 is urged counterclockwise about its pivotal connection with lever 160 by a spring 157 and is arrested in the position of Fig. 10 by a stud 1581 carried by a lever 158. The latter is mounted on a shaft 1582 and is pivotally connected to a slide 159, which is urged leftwards by a spring 1591 which prevails over the spring 157. A reciprocating bar 253, normally arrests the slide 159 in the position of Fig. 10.

The slide 159 is provided with a set of stop lugs 254 which may be selectively arrested by studs 255 secured to the stems 256 of a set of depressible function control keys. Fig. 10 shows the stems 256 of four keys, which are, beginning from the left, the total and subtotal keys for the upper register 17′ and the total and subtotal keys for the lower register 17″. These keys are well known in the art and will not be described. However, it may be assumed that said keys are, in the order cited, the keys 49′, 50′, 49″ and 50″ shown in Fig. 2 of my said copending application.

The mode of operation of the slide 159 is similar to that of the slide 152, with the only difference that an auxiliary reciprocable stop 257 is provided. This stop is operated by a universal bail controlled by said four keys in such a way that upon depression of any one of the keys the stop 257 releases the slide 159. Therefore, the slide 159 is enabled to move upon depression of one of said keys only. According to the key stem 256 depressed, the slide 159 is arrested in four different positions. The corresponding positions assumed by the stud 1581 carried by the lever 158 and by the slide 143 are shown with dotted lines in Fig. 12, and designated as T′, ST′, T″ and ST″.

As described above, upon conditioning the machine for an additive or a subtractive entry into the upper register the slide 152 is immediately arrested by the stud 251 of the corresponding key stem 252, Fig. 9, while the slide 159 is arrested by the stop 257, Fig. 10.

At the begining of the ensuing machine cycle the stud 155 of the lever 247 engages the bent-over lug 153 of the lever 160, Fig. 10, thus rocking the latter clockwise, whereby the slide 143 is positively shifted rightwards. Since the studs 141′ and 141″ are in a position within the cutout portion of the slide 143, as shown in Fig. 10, the movement of the slide 143 is ineffective to change the position of the registers. The slide 143 is thereupon restored to the left by the spring 157.

Near the end of half a revolution of the shaft 45 the stud 147, Fig. 9, engages the bent-over lug 145 of the lever 144, rocking the latter counterclockwise, whereby the slide 142 is positively shifted leftwards. The stud 141′ is thus engaged and the lever 139′ is rocked clockwise, whereby its stud in travelling within the cam slot 137′ shifts the slide 133′ rightwards. Since the lever 138′, Fig. 7, is bodily connected to the rocking shaft 135′ of the lever 139′, the left hand slide 133′, Fig. 13, is shifted together with the right hand slide 133′ and the upper register 17′, is shifted into engagement with the actuators 21, Fig. 1.

The lever 139′, Fig. 9, is held in its rocked position by the detent plate 140. Near the end of the machine cycle the stud 148 engages the bent-over lug 146, whereby the slide 142 is positively restored to the right and the register is disengaged from the actuators 21.

Upon conditioning the machine for an adidtive or a subtractive entry into the lower register 17″ the slides 152 and 142, Fig. 9, are permitted to advance into their position marked II, whilst, as described above, the slide 159, Fig. 10, is arrested by the stop 257.

As in the case described above, the slide 143, when shifted rightwards, does not affect any of the studs 141′ and 141″.

The slide 142, when shifted leftwards, engages the stud 141″ and causes the lower register 17″ to engage with the actuators 21. Near completion of the machine cycle the slide 142 is positively restored to the right, whereby the register is disengaged from the actuators 21. Moreover, the reciprocating bar 249 restores the slide 152 to normal position, whereby the spring 150 is enabled to return the slide 142 to normal position.

Upon conditioning the machine for a non-add operation, the slides 152 and 142, Fig. 9, are permitted to advance into their position NA, whilst the slide 159, Fig. 10, is arrested by the stop 257.

In the last named position the slide 142 does not affect either of the studs 141′ and 141″ and both registers remain in their disengaged position. At the end of the machine cycle the spring 150 returns the slide 142 to normal position.

When taking a total from either register, two different cases are to be considered.

If the total taken from one of said registers is not to be entered into the other register, upon depression of the total key concerned the slide 152, Fig. 9, is enabled to advance into the position marked NA, whereby the slide 142 becomes ineffective.

If, on the contrary, the total taken from one of said registers is to be entered into the other register, the corresponding add or subtract key is depressed together with the total key concerned, whereby the register into which the total is to be entered is put into engagement with the actuators 21 as described above.

In both cases the register from which the total is to be taken is put into engagement with the actuators 5 as follows.

Upon conditioning the machine for taking a total from the upper register 17′ the slide 159, Fig. 10, is permitted to advance until arrested by the stud 255 of the leftmost key stem 256 and the slide 143 assumes the position T′ shown in Fig. 12. Upon the ensuing rightward movement of the slide 143, the stud 141′ is engaged and the lever 139′, Fig. 9, is rocked counterclockwise, whereby the upper register 17′ is shifted into engagement with the actuators 5, Fig. 1.

The lever 139′, Fig. 9, is held in its rocked position by the detent plate 140 and the slide 143 is thus prevented from being returned to the left by the spring 157. As the stud 156 engages the bent-over lug 154 the slide 143 is positively restored to the left and the upper register is disengaged from the actuators 5.

Near completion of the machine cycle the slide 159, the lever 158 and the slide 143 return to normal position.

Upon conditioning the machine for taking a subtotal from the upper register 17′ the slide 159, Fig. 10, is permitted to advance until arrested by the stud 255 of the second key stem 256 from the left and the slide 143 assumes the position ST′ shown in Fig. 12. The stud 141′ is thereupon engaged and the upper register 17′ is shifted into engagement with the actuators 5 as described above. However, due to the position taken by the stud 141′ within the cutout of the slide 143, the latter does not engage the stud 141′ when restored to the left, whereby the register remains in engagement with the actuators 5.

To disengage the register before completion of the machine cycle another device is provided, which will now be described with reference to Fig. 7. Near the end of the machine cycle a stud 162, fastened to a lever 163 secured to the main shaft 45, engages a link 164 and moves it to the left. At its right hand end the link 164 is provided with two projections adapted to cooperate with lugs 165′ and 165″, respectively, bent from the levers 138′ and 138″. The lever 138′ is thus rocked clockwise and the upper register 17′ is disengaged from the actuators 5. The link 164 is thereafter restored to normal by a spring not shown in the drawing.

Upon conditioning the machine for taking a total from the lower register 17″ the slide 159, Fig. 10, is permitted to advance until arrested by the stud 255 of the third key stem 256 from the left and the slide 143 assumes the position T″ shown in Fig. 12. The stud 141″ is thus engaged first for shifting the lower register 17″ into engagement with the actuators 5 and thereupon for shifting the same out of said engagement.

Upon conditioning the machine for taking a subtotal from the lower register 17″ the slide 159, Fig. 10, is permitted to advance until arrested by the stud 255 of the first key stem 256 from the right and the slide 143 assumes the position ST″ shown in Fig. 12. The stud 141″ is thus engaged for shifting the lower register 17″ into engagement with the actuators 5. Near completion of the machine cycle the lower projection of the link 164, Fig. 7, engages the lug 165″ of the lever 138″ and the lower register is disengaged from the actuators 5.

As shown in Fig. 9, the stud 134′ may be eccentric to vertically adjust the slide 133′. Moreover, to enable the slide 133′ to be adjusted horizontally, the cam slot 137′, instead of being cut directly into the slide 133′, as shown in Fig. 9, may be cut into an auxiliary plate 136′, Fig. 11, adjustable on the slide 133′. Of course, similar arrangements may be provided for the lower register 17″.

For the purpose of safety, as in the case in which a register is accidentally prevented from being shifted, a yieldable connection may be provided at any suitable point of the engaging and disengaging mechanisms as for instance between the lever 144 and the actuator 142, Fig. 9, and between the lever 160 and the actuator 143, Fig. 10.

Fig. 5 represents a modified form of the detent mechanism of the register pinions. According to this modification, a single detent bar, instead of a pair of detent bars, is provided.

As shown in Fig. 5, a lever 258 is pivoted on the pivot stud 107 projecting from the inner side of each register cradle frame piece 105. Two studs 259 are fastened to the lever 258 and are engageable by the edges 244 and 245 of the plates 119′ and 119, respectively, in the same manner as the detent bars 108 described above. A further stud 260, secured to the lever 258, arrests a lever 262 pivoting about one of the shafts 104 and urged counterclockwise by a spring 261. A detent bar 263 is supported by lever 262 and a companion lever likewise pivoted about shaft 104 at the opposite end thereof and is adapted to fully enter the space between two teeth of each pinion of one set of register pinions, thus positioning both sets of register pinions.

It will be apparent that the detent bar 263 is lifted from the register pinions each time the register is shifted into engagement with either set of actuators, whether in additive or in subtractive position.

From the foregoing description it will be understood that many changes may be made in the above construction, and different embodiments of the invention could be made without departing from the scope thereof. It is, therefore, intended that all matter contained in the above description, or shown in the accompanying drawings, shall be interpreted as illustrative, and not in a limiting sense.

What I claim is:

1. In an adding and subtracting machine, a register comprising a cradle frame supporting two sets of intermeshing register wheels, a first set of actuators for said wheels, a second set of actuators for said wheels, means for reversing said register for addition and subtraction, cycling means, means for conditioning the machine for amount entering operations, means for conditioning the machine for total taking operations, and means for selectively shifting said cradle frame toward and from either set of actuators to engage said wheels and said actuators, said shifting means including a shifting member associated with said cradle frame, first reciprocable actuating means controlled by said amount entering conditioning means for actuating said shifting member to shift said cradle frame toward and from the first set of actuators, means operated by said cycling means for reciprocating said first actuating means during certain phases of a machine cycle, second reciprocable actuating means controlled by said total taking conditioning means for actuating said shifting member to shift said cradle frame toward and from the second set of actuators, and means operated by said cycling means for reciprocating said second actuating means during certain other phases of a machine cycle.

2. In a machine as claimed in claim 1, third reciprocable actuating means for actuating said shifting member, and means operated by said cycling means for invariably reciprocating said third actuating means near the end of a machine cycle to shift said cradle frame from either set of actuators.

3. In an adding and subtracting machine, comprising a register having a cradle frame reversible through 180° about a pivot and supporting two sets of intermeshing register wheels disposed in diametric opposition, a first set of actuators for said wheels disposed on one side of said register, a second set of actuators for said wheels disposed on the opposite side of said register, means for reversing said cradle frame for addition and subtraction, and means for selectively moving said register from a normal position toward and from either set of actuators to engage and disengage said wheels and said actuators, the combination of a first abutment on said cradle frame, a first pair of fixed stops disposed in diametric opposition at equal distances from said pivot and selectively adapted to angularly arrest said first abutment when the register is in said normal position, said first pair of fixed stops being further selectively adapted to angularly lock said first abutment when the register is moved towards the set of actuators disposed on the side of the register corresponding to the arrested first abutment, a second abutment on said cradle frame diametrically opposite to said first abutment, and a second pair of fixed stops disposed in diametric opposition, said second pair of fixed stops being normally ineffective and selectively adapted to angularly lock said second abutment when the register is moved toward the set of actuators disposed on the side of the register opposite to the arrested first abutment.

4. In an adding and subtracting machine, a main operating mechanism, a cradle frame reversible through 180° about a pivot and supporting a register having two sets of intermeshing register wheels disposed in diametric opposition, and means for reversing said cradle frame, said reversing means comprising a reciprocable actuator having two selectable sets of driving elements disposed in diametric opposition with respect to said pivot, means operable by said main operating mechanism for cyclically reciprocating said actuator, and driven means on said frame and reversible with said cradle frame about said pivot and having two sets of driven elements, each one of said sets of driven elements being engageable by a corresponding one of said sets of driving elements, means for adjusting said actuator transversely to the direction of reciprocation to select the set of driving elements for engagement with the corresponding set of driven elements, the elements of the selected set of driving elements being operative upon reciprocation of said actuator in one direction to sequentially drive the corresponding set of driven elements.

5. In an adding and subtracting machine, a cradle frame reversible through 180° about a pivot and supporting a register having two sets of intermeshing register wheels disposed in diametric opposition, and means for reversing said cradle frame, said reversing means comprising an actuator reciprocable between a normal and an actuated position and having a pair of opposed racks disposed in diametric opposition with respect to said pivot, and a mutilated pinion on said cradle frame reversible with said cradle frame about said pivot and engageable by said racks selectively, the mutilation of said mutilated pinion enabling the selected rack to rotate said pinion upon movement from said normal to said actuated position and to return idly to normal position without affecting said pinion, and means to adjust said actuator transversely to the direction of reciprocation to select the rack for engagement with said pinion.

6. In a computing machine, a first register having a set of register wheels, a second register having a set of register wheels, differential actuators for said wheels, means for conditioning the machine for selective operation of said registers by said actuators, a first means for shifting said first register toward and away from said actuators, a second means for shifting said second register toward and away from said actuators independently of said first register, a common reciprocable actuator for operating said first or second shifting means, said reciprocable actuator being bodily provided with means for selectively engaging said first or second shifting means, and means controlled by said conditioning means for variably setting said reciprocable actuator transversely to the direction of reciprocation to selectively position said engaging means for engagement with said first or second shifting means.

7. In a computing machine, a register having a set of register wheels, differential actuators for said wheels, means for conditioning the machine for total and subtotal operations, means for shifting said register toward and from engagement with said differential actuators, a reciprocable actuator for operating said shifting means, said reciprocable actuator being provided with two selectable means for engaging said shifting means during different phases of its reciprocation, and means controlled by said conditioning means for variably setting said reciprocable actuator to selectively position said engaging means for engagement with said shifting means.

8. In a computing machine, a first register having a set of register wheels, a second register having a set of register wheels, differential actuators for said wheels, means for conditioning the machine for total or subtotal operations in connection with each one of said registers, a first means for shifting said first register toward and away from said actuators, a second means for shifting said second register toward and away from said actuators independently of said first register, a common reciprocable actuator for said first and second shifting means, said reciprocable actuator being bodily provided with two selectable means for alternately engaging said first or second shifting means during different phases of its reciprocation, and means controlled by said conditioning means for variably setting said reciprocable actuator transversely to the direction of reciprocation to selectively position said engaging means for engagement with said first or second shifting means.

9. In a computing machine, a first register having a set of register wheels, a second register having a set of register wheels, differential actuators for said wheels, means for conditioning the machine for add or subtract operations, means for conditioning the machine for total or subtotal operations, a first means for shifting said first register toward and from engagement with said actuators, a second means for shifting said second register toward and from engagement with said actuators independently of said first register, a first common reciprocable actuator for said first and second shifting means, said first actuator being provided with means for selectively engaging said first or second shifting means, means controlled by said first named conditioning means for variably setting said first actuator to position said engaging means for selectively engaging said first or second shifting means, a second common reciprocable actuator for said first and second shifting means, said second actuator being provided with two selectable means for alternately engaging said first or second shifting means during different phases of its reciprocation, and means controlled by said second named conditioning means for variably setting said second actuator to position said selectable means for selectively engaging said first or second shifting means.

10. In an adding and subtracting machine, a first and a second register each having a cradle frame reversible through 180° about a pivot and supporting two sets of intermeshing register wheels disposed in diametric opposition, a first set of differential actuators engageable with either set of wheels of each register in amount entering operations, a second set of differential actuators engageable with either set of wheels of each register in total taking operations, said first and second sets of actuators being disposed in diametric opposition with respect to said pivots, means for conditioning the machine for amount entering operations in either register, means for conditioning the machine for total taking operations in either register, a first means for shifting the cradle frame of the first register toward and from engagement with either set of differential actuators, a second means for shifting the cradle frame of the second register toward and from engagement with either set of differential actuators, a first common reciprocable actuator for said first and second shifting means to engage and disengage the corresponding register with said first set of differential actuators, said first actuator being provided with means for selectively engaging said first or second shifting means, means controlled by said amount entering conditioning means for variably setting said first actuator to selectively position said engaging means for selective engagement with said first or second shifting means, a second common reciprocable actuator for said first and second shifting means to engage and disengage the corresponding register with said second set of differential actuators, said second actuator being provided with two selectable means for alternately engaging said first or second shifting means during different phases of its reciprocation to perform total or subtotal taking operations, and means controlled by said total taking conditioning means for variably setting said second actuator to selectively position said selectable means for engagement with said first or second shifting means, said first and said second actuators being adapted to engage during a single machine cycle alternate ones of said first and second shifting means to substantially simultaneously shift the corresponding registers in opposed directions to effect a total transfer.

11. In a computing machine, a register having a set of register wheels, differential actuators for said wheels, cycling means, means for conditioning the machine for amount entering operations, means for conditioning the machine for total and subtotal taking operations, means for shifting said register toward and from said differential actuators to engage and disengage said wheels and said differential actuators, a first reciprocable actuating member for operating said shifting means, means operated by said cycling means for reciprocating said first member during certain phases of a machine cycle, means controlled by said amount entering conditioning means for causing said shifting means to be actuated by said first member, a second reciprocable actuating member for said shifting means, means operated by said cycling means for reciprocating said second member during certain other phases of a machine cycle, and means conditionable by said total and subtotal taking conditioning means for controlling the operative relationship of said second member and said shifting means to cause said shifting means to be variably actuated by said second member.

12. In a computing machine, a register having a set of register wheels, differential actuators for said wheels, cycling means, means for conditioning the machine for amount entering operations, means for conditioning the machine for total and subtotal taking operations, means for shifting said register toward and from said differential actuators to engage and disengage said wheels and said differential actuators, first reciprocable actuating means for operating said shifting means, means operated by said cycling means for reciprocating said first actuating means during certain phases of a machine cycle, means controlled by said amount entering conditioning means for causing said shifting means to be actuated by said first actuating means, second reciprocable actuating means for said shifting means, means operated by said cycling means for reciprocating said second actuating means during certain other phases of a machine cycle, means conditionable by said total and subtotal taking conditioning means for controlling the operative relationship of said second actuating means and said shifting means to cause said shifting means to be variably actuated by said second actuating means, third actuating means for said shifting means, and means operated by said cycling means for invariably driving said third actuating means near the end of a machine cycle to cause said shifting means to shift said register from said actuators.

13. In an adding and subtracting machine having a register, a set of reciprocable differential actuators for said register, cycling means, said differential actuators being conditionable by said cycling means to reciprocate through a forward and a return stroke, an adding key, a subtracting key, a total key, and a subtotal key, a register engaging and disengaging mechanism, said mechanism comprising a shifting member operable for shifting said register into and out of engagement with said set of actuators, a first reciprocable actuator for operating said shifting member, first means controlled by said cycling means for reciprocating said first actuator to displace and restore same at the beginning and at the end of said return stroke, respectively, means conditionable by said adding and subtracting keys for controlling the operative relationship of said first actuator and said shifting member to cause register engagement and disengagement, a second reciprocable actuator for operating said shifting member, second means controlled by said cycling means for reciprocating said actuator to displace and restore same at the beginning and at the end of said forward stroke, respectively, means conditionable by said total key for controlling the operative relationship of said second actuator and said shifting member to cause register engagement and disengagement, means conditionable by said subtotal key for controlling said last named operative relationship to cause register engagement, a third actuator for operating said mechanism to cause register disengagement, and third cam means controlled by said cycling means for driving said third actuator near the end of a machine cycle.

14. In an adding and subtracting machine having a register, a set of reciprocable differential actuators for said register, cycling means, said differential actuators being conditionable by said cycling means to reciprocate through a forward and a return stroke, an adding key, a subtracting key, a total key, and a subtotal key, a register engaging and disengaging mechanism, said mechanism comprising a shifting member operable for shifting said register into and out of engagement with said set of actuators, a first reciprocable actuator for operating said shifting member, first means controlled by said cycling means for reciprocating said first actuator to displace and restore same at the beginning and at the end of said return stroke, respectively, means conditionable by said adding and subtracting keys for controlling the operative relationship of said first actuator and said shifting member to cause register engagement and disengagement, a second reciprocable actuator for operating said shifting member, second means controlled by said cycling means for reciprocating said second actuator to displace and restore same at the beginning and at the end of said forward stroke, respectively, means conditionable by said total key for controlling the operative relationship of said second actuator and said shifting member to cause register engagement upon displacement and disengagement upon restoration of said second actuator, means conditionable by said subtotal key for controlling said last named operative relationship to cause register engagement upon displacement of said second actuator and idle restoration thereof, a detent for positioning said register in engaged position, a third actuator for operating said shifting member to cause register disengagement against the action of said detent, and third cam means controlled by said cycling means for driving said third actuator near the end of a machine cycle.

References Cited in the file of this patent

UNITED STATES PATENTS

| | | |
|---|---|---|
| 1,817,451 | Gubelmann | Aug. 4, 1931 |
| 2,048,453 | Kall | July 21, 1936 |
| 2,059,252 | Lasker | Nov. 3, 1936 |
| 2,141,269 | Ewald et al. | Dec. 27, 1938 |
| 2,203,336 | Landsiedel | June 4, 1940 |
| 2,203,533 | Landsiedel | June 4, 1940 |
| 2,243,150 | Ewald et al. | May 27, 1941 |
| 2,583,810 | Boyden | Jan. 29, 1952 |
| 2,741,426 | Goleman | Apr. 10, 1956 |

UNITED STATES PATENT OFFICE

CERTIFICATE OF CORRECTION

Patent No. 2,954,921 October 4, 1960

Natale Capellaro

It is hereby certified that error appears in the printed specification of the above numbered patent requiring correction and that the said Letters Patent should read as corrected below.

Column 13, line 33, before "actuator" insert -- second --.

Signed and sealed this 11th day of April 1961.

(SEAL)
Attest:
ERNEST W. SWIDER
Attesting Officer

ARTHUR W. CROCKER
Acting Commissioner of Patents